(12) United States Patent
Mehnert et al.

(10) Patent No.: US 8,766,625 B2
(45) Date of Patent: Jul. 1, 2014

(54) LINEAR SEGMENT OR REVOLUTION COUNTER WITH A FERROMAGNETIC ELEMENT

(76) Inventors: Walter Mehnert, Ottobrunn (DE); Thomas Theil, Weichs (DE)

( * ) Notice: Subject to any disclaimer, the term of this patent is extended or adjusted under 35 U.S.C. 154(b) by 880 days.

(21) Appl. No.: 12/673,581

(22) PCT Filed: Aug. 7, 2008

(86) PCT No.: PCT/DE2008/001305
§ 371 (c)(1),
(2), (4) Date: May 25, 2010

(87) PCT Pub. No.: WO2009/024119
PCT Pub. Date: Feb. 26, 2009

(65) Prior Publication Data
US 2011/0006757 A1 Jan. 13, 2011

(30) Foreign Application Priority Data
Aug. 17, 2007 (DE) .......................... 10 2007 039 050

(51) Int. Cl.
| | |
|---|---|
| *G01B 7/30* | (2006.01) |
| *G01D 5/14* | (2006.01) |
| *G01D 5/20* | (2006.01) |
| *G01P 3/481* | (2006.01) |

(52) U.S. Cl.
CPC .............. *G01D 5/145* (2013.01); *G01D 5/2033* (2013.01); *G01P 3/4815* (2013.01)
USPC ............ 324/207.25; 324/207.24; 324/207.23; 324/207.15; 324/207.2

(58) Field of Classification Search
USPC ....................................... 324/207.15, 207.24
See application file for complete search history.

(56) References Cited

U.S. PATENT DOCUMENTS

| | | | |
|---|---|---|---|
| 2,235,393 A | 2/1939 | Baker | |
| 4,150,314 A * | 4/1979 | Zabler et al. .................. | 310/155 |

(Continued)

FOREIGN PATENT DOCUMENTS

| | | | | |
|---|---|---|---|---|
| DE | 2817169 C2 | 10/1979 | | |
| DE | 3619500 A1 * | 6/1986 | .............. | G01P 3/487 |

(Continued)

OTHER PUBLICATIONS

The State Intellectual Property Office of P.R. China, First Notification of Office Action (PCT Application Entry Into the National Phase), Jan. 18, 2012, Linear Segment or Revolution Counter With a Ferromagnetic Element, Application No. 200880103159.9, pp. 1-15.

(Continued)

*Primary Examiner* — Richard Isla Rodas
(74) *Attorney, Agent, or Firm* — Woodling, Krost and Rust (57) ABSTRACT

Absolute counters for linear segments or revolutions having a Wiegand element (WE) in the main field between two opposite excitation magnets ($EM_1$, $EM_2$) connected by a common ferromagnetic back connection body (14), and an additional sensor element (SE) for determining the information about the polarity and the position of the excitation magnet, wherein the output signals of the Wiegand element (WE) simultaneously supplies energy for the required counter and logic electronics, as well as having an additional sensor (ZS) for the fine resolution in the frame work of a multi-turn which also lies within the main field between the excitation magnets ($EM_1$, $EM_2$).

42 Claims, 6 Drawing Sheets

(56) References Cited

U.S. PATENT DOCUMENTS

| | | | |
|---|---|---|---|
| 4,364,013 A | 12/1982 | Castera | |
| 5,148,106 A | 9/1992 | Ozawa | |
| 5,565,769 A * | 10/1996 | Mehnert et al. | 324/207.15 |
| 5,714,882 A * | 2/1998 | Mehnert et al. | 324/207.15 |
| 6,084,400 A * | 7/2000 | Steinich et al. | 324/207.13 |
| 6,265,867 B1 * | 7/2001 | Fowler | 324/207.25 |
| 7,113,063 B2 * | 9/2006 | Romanik et al. | 335/205 |
| 2001/0052766 A1 * | 12/2001 | Drescher et al. | 324/158.1 |
| 2006/0164077 A1 * | 7/2006 | Mehnert et al. | 324/207.23 |
| 2011/0184691 A1 * | 7/2011 | Mehnert et al. | 702/151 |

FOREIGN PATENT DOCUMENTS

| | | |
|---|---|---|
| DE | 3619500 A1 | 12/1987 |
| DE | 4107847 C1 | 9/1992 |
| DE | 102 59 223 B3 | 2/2004 |
| DE | 20 2007 006 955 U1 | 8/2007 |
| DE | 197 22 016 A1 | 12/2009 |
| EP | 0724712 B1 | 9/1995 |
| EP | 1 607 720 A2 | 6/2005 |
| GB | 2 017 337 A | 9/1981 |
| GB | 2071337 A | 9/1981 |
| WO | 2004046735 A1 | 6/2004 |
| WO | 2009/024119 | 2/2009 |

OTHER PUBLICATIONS

European Patent Office, Jul. 28, 2011, Examination Report, Application No. 08 801 138.2-1236, Applicant Walter Mehnert, pp. 1-4.

International Search Report, International Application No. PCT/DE2008/001306, WO 2009/024119 A3, Sep. 3, 2009.

U.S. Appl. No. 12/672,897, PCT/DE08/1306, Filed Feb. 10, 2010, Entitled "Absolute High Resolution Segment or Revolution Counter", Inventors Walter Mehnert and Thomas Thiel.

Seligsohn Gabrieli & Co., Letter Informing the Receipt of the First Office Action and Its Contents in English, Jul. 9, 2013, pp. 1-4, Israel Patent Application No. 203952—National Phase of PCT/DE2008/001305.

Canadian Intellectual Property Office, Office Action, Mar. 12, 2014, Canadian Application No. 2696690, Linear Segment or Revolution Counter Having a Ferromagnetic Element, Owners: Mehnert, Walter, Theil, Thomas, pp. 1-4.

* cited by examiner

LINEAR SEGMENT OR REVOLUTION COUNTER WITH A FERROMAGNETIC ELEMENT

The invention relates to an absolute linear segment or revolution counter having a ferromagnetic element which counts in both directions.

An absolute linear segment or revolution counter retrieves its count information which it is storing permanently, without the aid of external electrical energy. It generates the electrical energy required for counting and storing from the kinetic energy of the drive, and this under all conditions, i.e. also at speeds approaching zero. The number of the revolutions to be detected and stored is, therein, unlimited in respect to physics.

Ferromagnetic elements for the detection of translational and/or rotational movements are known as so called pulse wire movements detectors as disclosed in U.S. Pat. No. 4,364,013 or as Wiegand sensors as disclosed in the DE 41 07 847 C1 or the DE 2 817 169 C2, in which a pretreated wire out of a ferromagnetic material is wrapped by a sensor coil. The magnetic zones which are at the beginning randomly orientated in the ferromagnetic material—called magnetic domains or also Weiβ zones—orient themselves in one single domain under the influence of external mechanical and/or magnetic forces. Upon application of an external magnetic field of a certain direction and size, this domain "abruptly flaps over" which results in a voltage pulse which may be taken off as output signal.

In ferromagnetic materials, the interaction of the magnetic moments of adjacent atoms having different magnetization directions, is very strong which leads to an alignment of the moments in small areas of space. The above-mentioned, magnetic domains, the ferromagnetic element, Weiβ zones or areas are separated from each other by transition layers called Bloch walls. By the influence of external forces, it is possible—as stated above—to achieve that the above-mentioned, single domain, ferromagnetic element. If such a domain is brought to into an external magnetic field of a certain size and direction, the elementary magnets out of a starting position of the position of the largest magnetic field—normally an end of the wire-flap like dominos into the direction of the external field which leads to a wave of flapping events having a finite velocity in the ferromagnetic element, which is, however, large as compared to the velocity of the exciting magnet, so that one can speak clan "instantaneous flapping over" of this domain. The position of the largest magnetic field can also be the middle of the length of a wire shaped domain. In this case, to waves run from the middle to the ends which result in a double voltage which can be taken off.

The above-mentioned effect of the Bloch wall running across the ferromagnetic element, is used according to DE 102 59 223 for evaluating the polarity and the position of the excitation magnet in that, by means of an additional sensor element, the deployment direction of the magnetization reversal of the ferromagnetic element to be initiated from both front sides, i.e. the direction of the magnetization reversal of the ferromagnetic element, is determined.

In the general case which is characterized by an excitation magnet and the resolution of one half of a revolution, the revolution counter system is completely described by the four known excitation magnet states in connection with stored information under all conditions, namely:
1. North pole to the right of the ferromagnetic element
2. North pole to the left of the ferromagnetic element
3. South pole to the right of the ferromagnetic element
4. South pole to the left of the ferromagnetic element These four magnetic excitation states are fulfilled in rotational systems in case it is possible to unambiguously determine which magnetic pole lies on which of the four quadrants. For this purpose, four position-dependent, independent information values are needed two out of which are also derived from the coil SP as the polarity of the generated voltages. The remaining two are recognized or not recognized, respectively, from the Hall sensor SE as magnet polarity or magnet.

Starting from the mathematic, theoretical case that the Wiegand or pulse wires, respectively, are always operating correctly, it is not necessary to refer back to stored information in case of the linear segment or revolution counter, shown here, having a Wiegand element and an additional sensor element, when evaluating a counter value for both directions. This theoretical case is implicitly assumed in the solution with two pulse or Wiegand wires, as is, for example, discussed in the European patent EP 0 724 712. Unfortunately, the physics do not allow this theoretical case because there are always movement sequences in which the respective Wiegand or pulse wire, respectively fails by generating so called "runts". One has to refer back only then to stored information in the above solution with a Wiegand element and, for example, a Hall sensor. The solution mentioned in the above referenced patent with two Wiegand or pulse wires, however, also with reference to stored information results in false counter results because the stored information is already used for the idealized counter situation.

Furthermore, from the DE 202 007 006 955 U1, a device for measuring rotational movements is known in which two permanent magnets are fixed in parallel to the axis of rotation eccentrically and spaced from each other on a rotatable disk within the magnetic field (stray field) of which extending above the disk, a sensor in form of a Wiegand wire is arranged, the voltage pulses of which is also used for the energy supply of the device. Because the Wiegand wire is not in the direct main field of the magnets, the distance between the magnet and the Wiegand wire becomes a critical value. A magnet which is small or bonded by plastics, respectively, and is, therefore, cost effective, cannot be used since its field would be too small. Furthermore, the Wiegand wire is located completely in the disturbing external field. Not to speak of the disturbing influences of the Wiegand wire itself on the single-turn if a multi-turn is required. A small sensor can, in this solution, not be built for this reason.

Finally, in the DE 197 22 016 A1, an arrangement for the contact-less detection of a rotational angle for a cam shaft of a motor is shown in which, at the inside of a rotatable, cylindrical cup, two opposite magnets are arranged which are coupled magnetically through the disk-shaped bottom of the cup. In the magnetic field formed between the magnets, to control elements formed on a carrier are provided for determining the angle between the magnetic field and the arrangement. In this way, an unambiguous angle determination between 0 and 180 degrees or between 180 degrees and 360 degrees, respectively, can be carried out in an angle range of 360 degrees.

However, no revolutions of the shaft carrying the magnets, but only two angular ranges within 360 degrees can be determined with such an arrangement. In case the homogenization of the magnetic field in between the magnets is an aim of the arrangement, the proposed cup can not be ferromagnetic because the covering disk disturbs the magnetic field between the magnets to a large extend and simultaneously weakens the magnetic field. The above mentioned magnetic coupling through the cup, at best, only points to a slightly ferromagnetic material as is the case with austenitic steel. Consequently, it is not referred to as a ferromagnetic material in any location in the document nor is spoken about safety against disturbances. As to solution for a revolution counter, there is written equally little as with respect to the one for a multi-turn. This is also apparent from the fact measurements are not at all possible at two points. The known arrangement describes, consequently, rather a solution in which structural errors, such as temperature variation and sensitivity to pressure, are reduced by means of two differing sensor elements for a single-turn.

In spite of the basically possible and conceivably simple mechanical structure of such detectors, the experience has shown that growing applications require a miniaturization of its structural elements with a concurrent magnetic shielding against external influences without, therein, giving away the advantages of the arrangement having a long life and being independent from external energy.

At the same time, it is, however, necessary—because of the use of an additional sensor to the multi-turn, to linearize and homogenize the magnetic fields.

The advantageous further development of such detectors as linear segment or revolution counter is, therefore, the objective of the invention.

Because of the inventive arrangement of the Wiegand element directly in the main field of one or between two excitation magnets, the magnetic back connection of which is formed by a common ferromagnetic back connection body, preferably formed as a closed ring, a revolution counter is provided which is formed symmetrical with respect to geometry and magnetic property, which rotation counter achieves smallest dimensions because it shows a number of indispensable advantages, is, thereby, cost effective and allows also the detection of highest rotational speeds.

These advantages are in particular:
1. the Wiegand element is shielded against:
   a) external magnetic fields;
   b) external electrical fields;
   c) the influence of external ferromagnetic elements which deform the main field;
2. The magnetic field is linearized and homogenized in the surrounding of the Wiegand element.

Therein, the main field connects either the output surfaces of the two excitation magnets or the output surface of one electromagnet with the input surface of the ferromagnetic compensation body wherein the vertical direction points in the direction of the Wiegand element. The magnetic flux exciting in the direction of the normal of the magnetization is called main field, wherein the normal is perpendicular to the rotation or movement axis, respectively. The magnetization normal is identical to the axis of the ferromagnetic elements FE in the drawings.

The closed ring can, therein, simultaneously be formed as a cover covering the revolution counter. The arrangement of the additional sensor element in the main field between the two excitation magnets is particularly advantages so that it takes the position in the main field at least once in each revolution or, in case of the arrangement as linear segment counter, once in each transition across a segment. The evaluation of polarity and the position of the excitation magnets are also always ensured. The excitation magnets consist, according to the invention, out of hard magnetic material bonded by plastics. Here, the Ba-ferrite and Co/Sm are advantageous as basic materials. Also rubber materials are within the commonly used plastics materials. In an advantageous way, the additional sensor element can also be arranged such that it is positioned in the stray field of only one of the two excitation magnets at least once in each revolution or transition across a segment, respectively. The additional sensor element is advantageously formed as a Hall sensor or as a field plate, it can, however, also be any kind of sensor which detects the respective position of the excitation magnet unambiguously, for example capacitive sensors.

It is common to all embodiments of the inventive linear segment or revolution counter that the energy required for the operation for counting is generated from the kinetic energy of the drive, i.e. that they are not relying on external energy supply.

In case that the reaction time period of the additional sensor element is larger than the duration of the voltage pulse from the ferromagnetic element, an energy storage is required. This is, for example, the case when using a Hall sensor according to the present art.

Additional sensor elements on a capacitive basis or field plates do not require an energy storage; out of reasons of reliability, one can be referred back to such an energy storage.

Also the centric arrangement is common to all embodiments of the inventive revolution counter, in which one or several excitation magnets rotate about a central area within which at least the Wiegand element is located.

As a matter of course, also redundant embodiments having two Wiegand elements and two Hall sensors as well as a pair of magnets the magnets of which are diametrically opposed to each other, can be realized. In this case, it is advantageous out of space reasons to split up the respective one coil into two half coils such that coils which are crosswise arranged about the rotational axis, are generated. The two ferromagnetic elements are, therein, also arranged crosswise in a plane.

The invention is described in the following referring to six embodiments which are schematically shown in the drawings.

Figure 1:
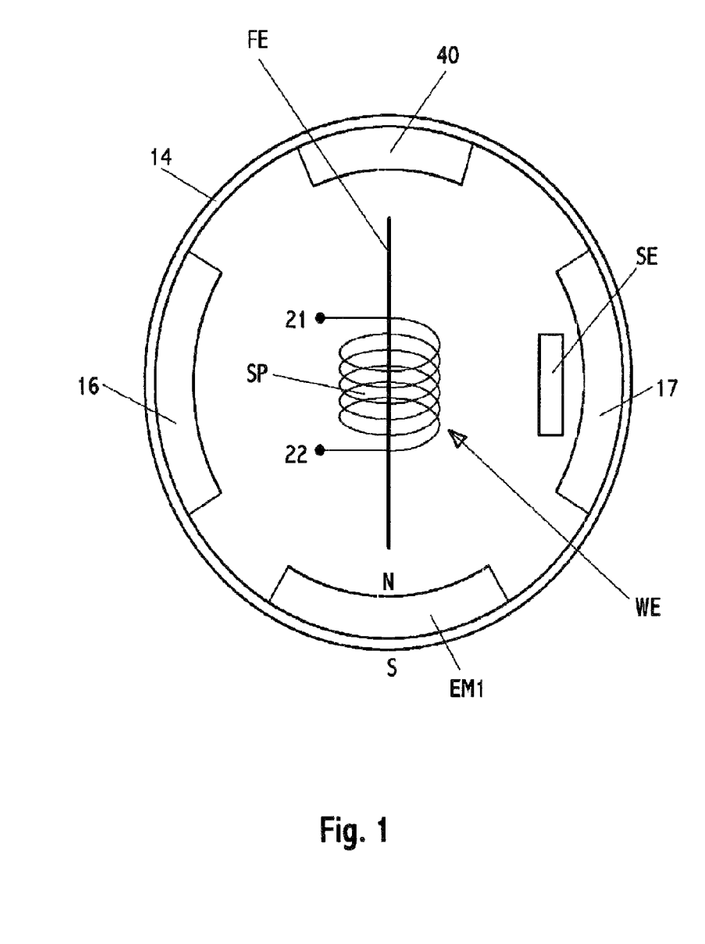
FIG. 1 shows, as a top view, the schematic arrangement of a first embodiment of a revolution counter according to the invention having a Wiegand element consisting of a ferromagnetic element and an induction coil axially associated to the ferromagnetic element, and one Hall sensor in the main field serving as an additional sensor element, as well as a ring shaped, balanced, ferromagnetic back connection body at the inside of which a segment shaped excitation magnet of constant thickness is arranged.
Figure 2:
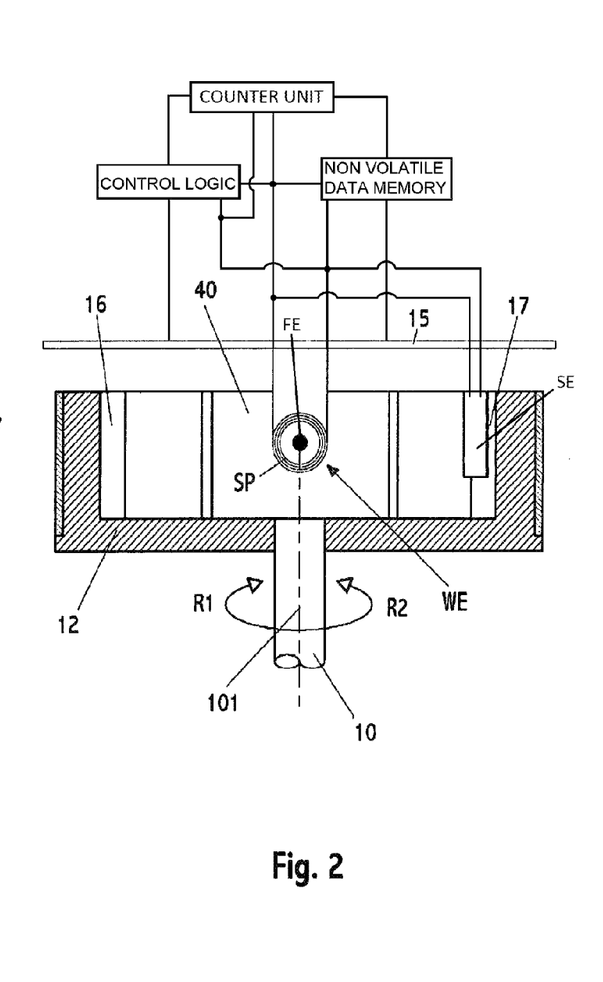
FIG. 2 shows a revolution counter of FIG. 1 in section.

In the first embodiment of the revolution counter shown in the FIGS. 1 and 2, the moving body is a shaft 10 which is adapted to be rotated in the direction of the arrows R1 and R2, i.e. in the clockwise or in the anti-clockwise sense. In order to be able to count the revolutions of the shaft 10, it is fixedly connected to a magnet carrier 12 to which a excitation magnet $EM_1$ having the shape of a circular section, is associated which comprises a north pole N and a south pole S. Which pole points to the Wiegand element WE is arbitrarily selectable. The excitation magnet is surrounded by a ring formed as a ferromagnetic back connection body 14 and balanced by means of a ferromagnetic compensation body 40, the radius of the ring corresponding to the radius of the excitation magnet $EM_1$ formed in the shape of a section of a circle. In the main field of the excitation magnet $EM_1$, there is a Wiegand element WE consisting out of a ferromagnetic element FE which is surrounded axially by a sensor coil SP, as well as an additional sensor element (SE) in the form of a Hall sensor in the main field of the excitation magnet $EM_1$. The Wiegand element WE with the additional sensor element (SE) is supported by a circuit hoard 15 in such a way in the main field between the excitation magnet $EM_1$ and the compensation body 40 that its ferromagnetic element FE is facing the output surfaces and, therefore, can be axially traversed by the field of the excitation magnet.

Accordingly, the Wiegand element is located at a position in the magnetic main field of the excitation magnet $EM_1$ in such a way that the normal of the output surfaces points in the direction of the ferromagnetic element FE. The voltage pulses generated as a result of the magnetization reversal of the ferromagnetic element FE can be taken from the output connections 21 and 22 of the sensor coil SP.

The further sector pieces 16 and 17 are non-magnetic parts of the magnetic carrier 12 affecting a rotational symmetry, and they support the ring shaped back connection body 14. The ring shaped back connection body 14 is balanced by means of a compensation body 14 which is a sector with enlarged thickness and serves simultaneously for homogenizing the field of the excitation magnet.

Such a revolution counter comprises, as an example, a diameter of 10-15 mm and can be operated with revolution speeds up to 100,000 rpm.

Figure 3:
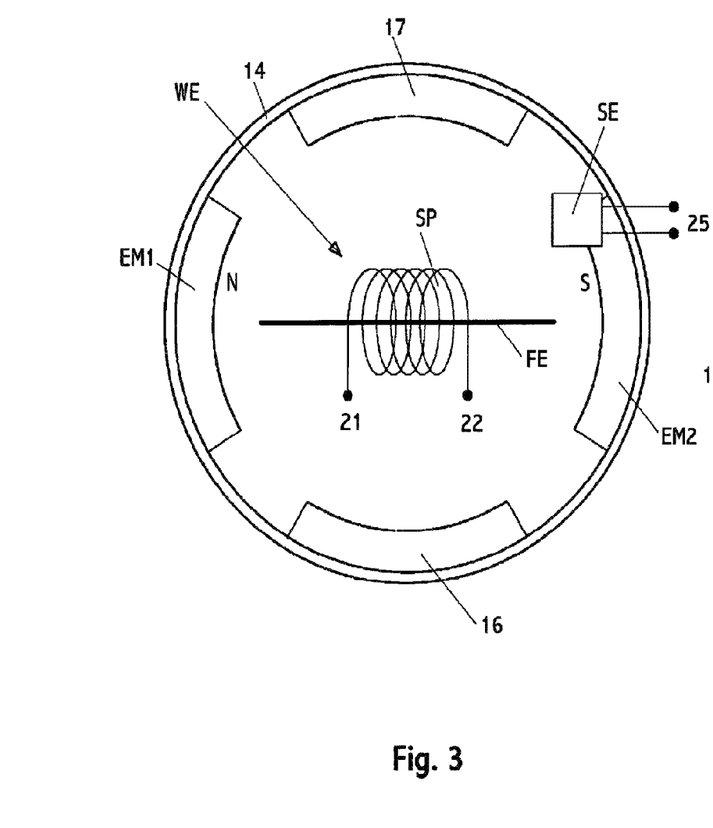
FIG. 3 shows, as a top view, the schematic arrangement of a second embodiment of a revolution counter having a Hall sensor as an additional sensor element in the stray field, and a closed ring-shaped, ferromagnetic back connection body having two identical excitation magnets at the inside of the ring.
Figure 4:
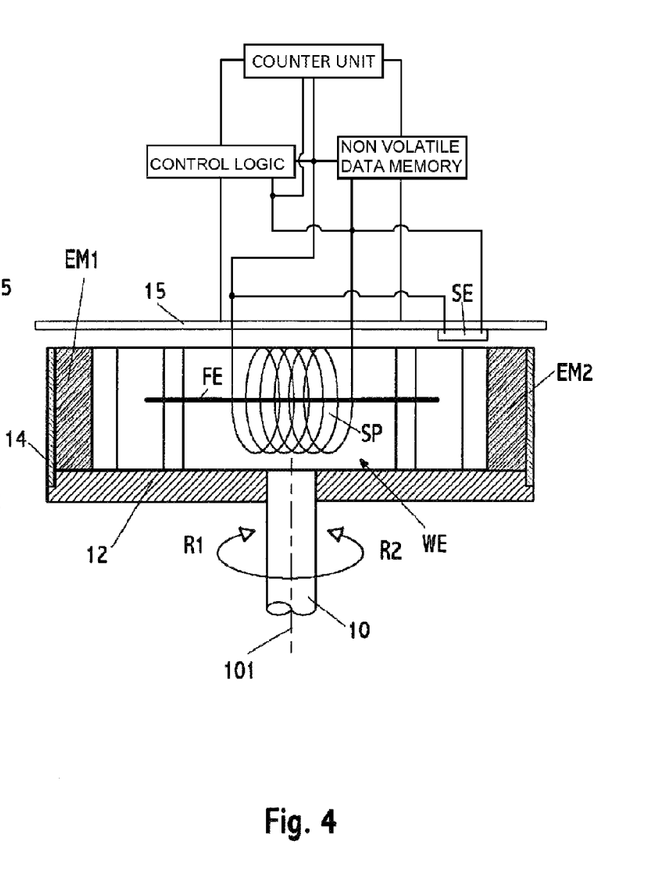
FIG. 4 shows the revolution counter of FIG. 3 in section.

In the embodiment of the FIGS. 3 and 4, corresponding structural elements have the same reference numbers as in the embodiment of the FIGS. 1 and 2. The difference is, however, that the Wiegand element WE is arranged in the main field between two excitation magnets ($EM_1$, $EM_2$). For determining the polarity of the excitation magnet upon passage of the ferromagnetic element FE, a Hall sensor is provided here as an additional sensor element SE at the output 25 of which a negative or a zero signal can be taken out depending on the polarity N or S of the excitation magnets and the position thereof. The two identical excitation magnets $EM_1$ and $EM_2$ provided diametrically to each other at the inner side of the ring-shaped back connection body 14, form, in case of the solution with the additional sensor ZS with relation to a homogeneous main field, which actuates the ferromagnetic element in the middle of its length, an optimal solution.

Figure 5:
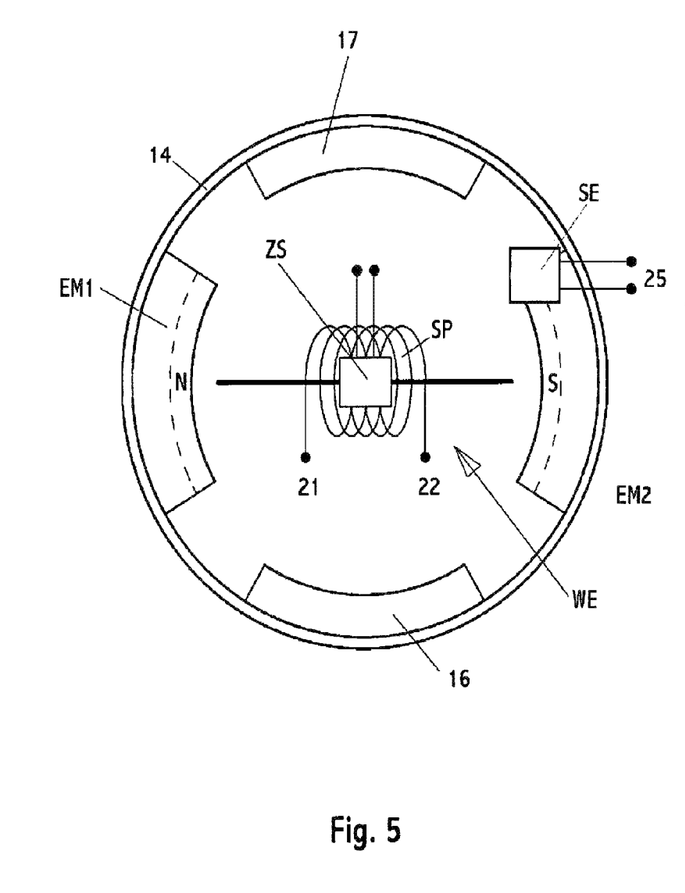
FIG. 5 shows, as a top view, the schematic arrangement of a third embodiment of a revolution counter according to the invention having a Wiegand element in the main field between two excitation magnets, an additional sensor element in the stray field as well as an additional sensor in the main field which serves for the fine resolution of a revolution in the frame work of a multi-turn, as well as a ring shaped back connection body having two identical excitation magnets arranged at the inner side thereof which, however, have different thickness dimensions in the direction of rotational axis.
Figure 6:
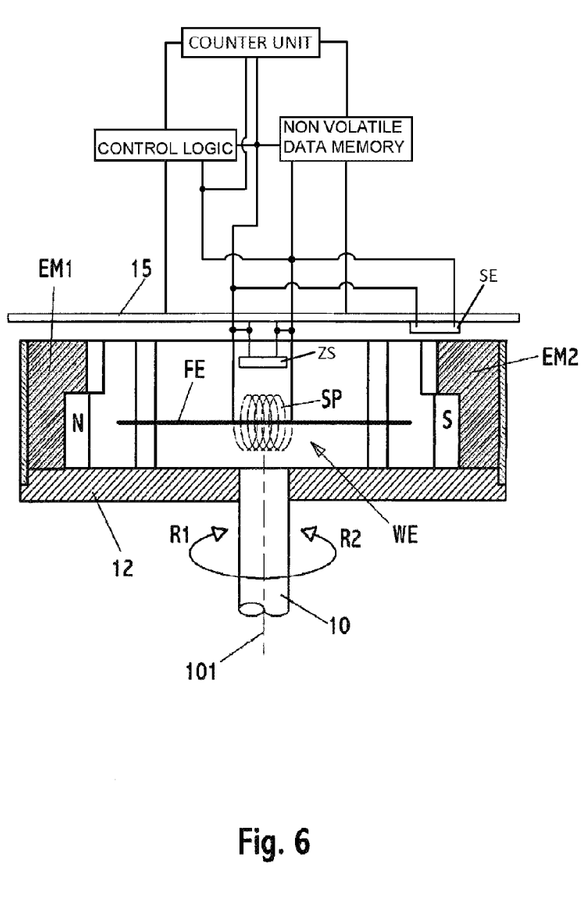
FIG. 6 shows the revolution counter of FIG. 5 in the section.

Also the embodiment of the revolution counter of FIGS. 5 and 6 comprises the device elements corresponding to the previously described embodiments of FIGS. 3 and 4; however, an additional sensor ZS is provided which provides the fine resolution of one revolution. Since it is also located in the main field between the two excitation magnets $EM_1$, $EM_2$, it is also electromagnetically shielded. For this purpose, it sees an almost homogeneous magnetic field which reduces, to a large extent, electromagnetically caused disturbances. The measurement signal, therefore, allows highest accuracy and resolution. Wiegand element and additional sensor see here the common back connection body 14; influences of the Wiegand element back to the additional sensor are drastically reduced in this way. The additional sensor element SE is positioned here in the stray field. Because the operational values of the field strength for the Wiegand element WE and the additional sensor ZS are very much different from each other, the two identical magnets $EM_1$, $EM_2$ arranged both in the ring shaped back connection body 14, are offset in the direction of the axis in view of an optimal operation.

Figure 7:
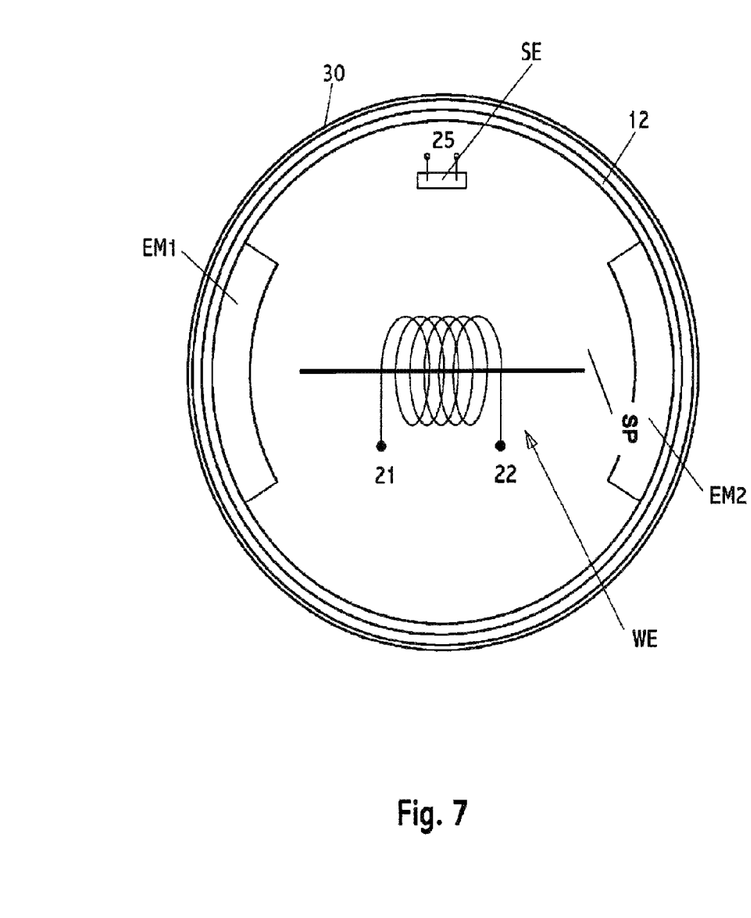
FIG. 7 shows, as a top view, the schematic arrangement of a fourth embodiment of the revolution counter according to the invention having a Wiegand element arranged between two excitation magnets, and an additional sensor element in form of a Hall sensor in the main field wherein the ferromagnetic hack connection body is formed as a cover of the revolution counter, and wherein the two identical excitation magnets are arranged at the inner side of the magnetic carrier.
Figure 8:
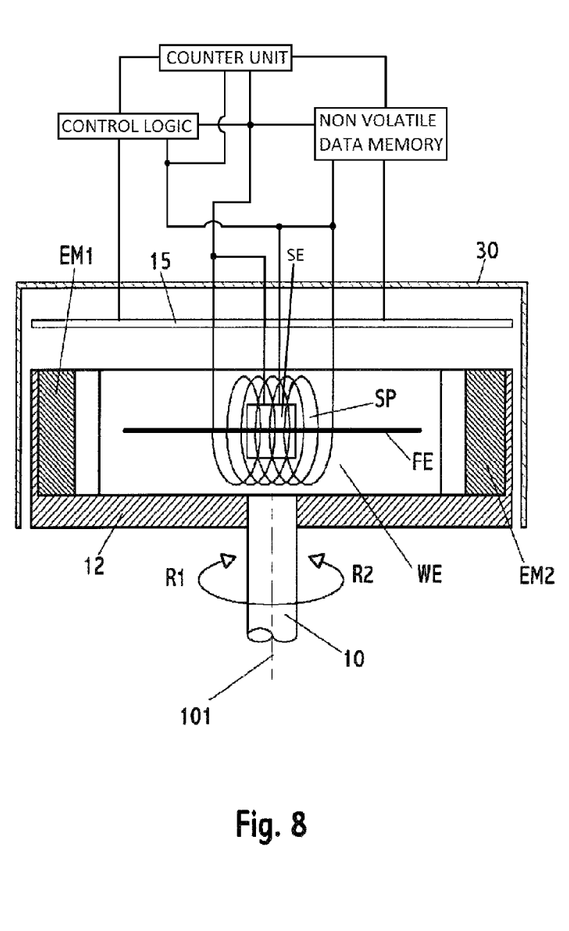
FIG. 8 shows the revolution counter of FIG. 7 in section.

Corresponding remarks are true for the embodiment of the revolution counter of the FIGS. 7 and 8. However, a cover 30 by means of which the revolution counter is covered, serves here as a ferromagnetic back connection body, and the revolution counter comprises a Wiegand element WE and a Hall sensor as an additional sensor element SE in the main field between two identical excitation magnets where the excitation magnets are provided in the inner side of the magnet carrier 12. This is a cost effective solution as concerns an overall shielding.

Figure 9:
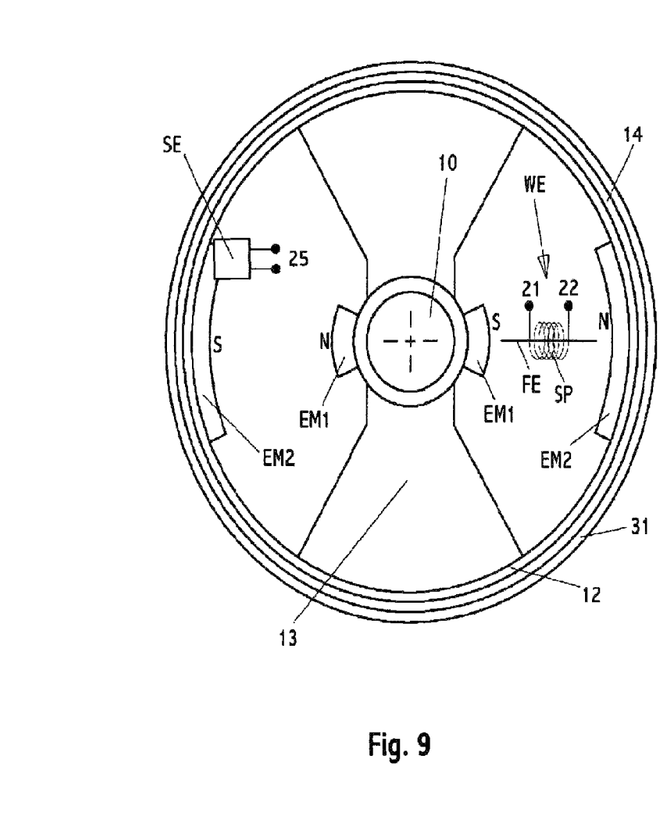
FIG. 9 shows, as a top view, the schematic arrangement of a fifth embodiment of a revolution counter according to the invention having four different excitation magnets which are located in pairs opposite to each other, in which a Wiegand element is arranged in the main field and the additional sensor element is arranged in the stray field.
Figure 10:
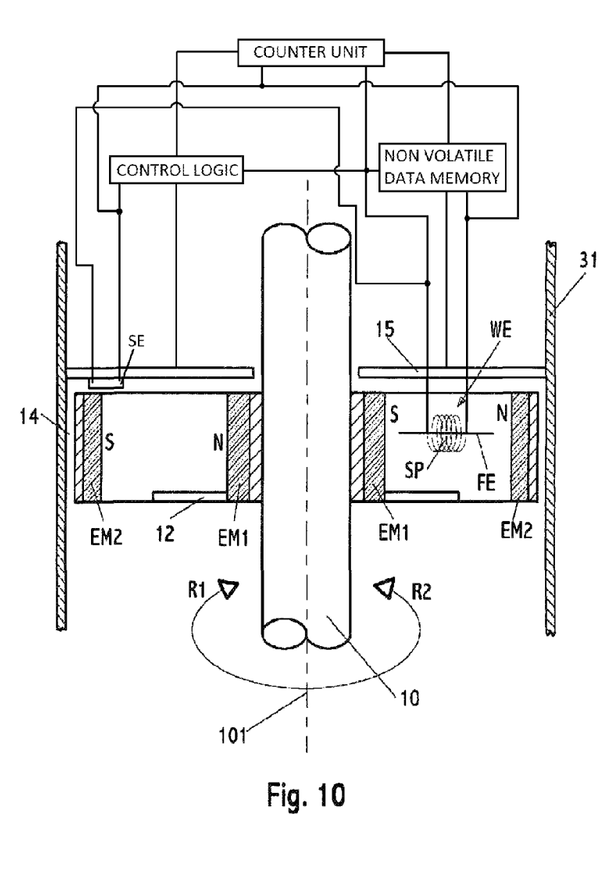
FIG. 10 shows the revolution counter of FIG. 9 in section.

The revolution counter shown in the FIGS. 9 and 10 comprises a Wiegand element WE consisting of a ferromagnetic element, an induction coil SP surrounding it, as well as an additional sensor element SE in the stray field as also shown in FIGS. 3 and 4. However, since a hollow shaft arrangement is concerned here, the arrangement has to be made such that opposite poled excitation magnet pairs $EM_1$ and $EM_2$ are present so that a magnetization reversal of the Wiegand element WE can be carried out. The additional sensor element SE is formed as a Hall sensor.

A double iron ring which is formed concentrically and is connected by means of two cross members 13, serves as ferromagnetic back connection body.

Also in this embodiment, the structural elements corresponding to the above described embodiments, have the same reference numbers, wherein the complete arrangement is enclosed in a housing 31.

Figure 11:
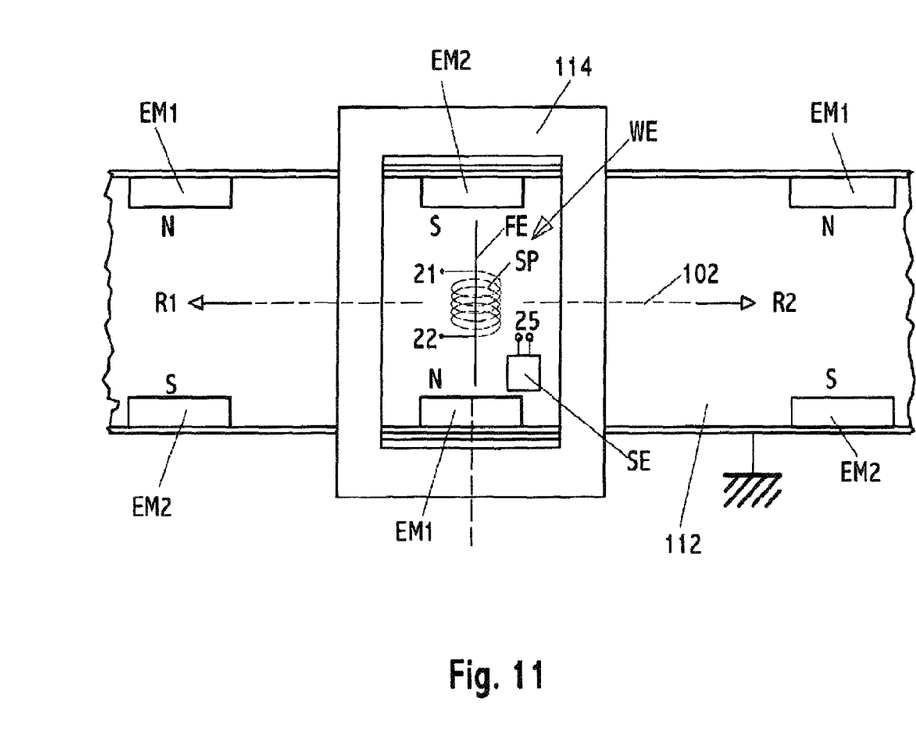
FIG. 11 shows, as a top view, the schematic arrangement of an embodiment of the invention arranged as a linear segment counter, having a Wiegand element in the main field between two excitation magnets and an additional sensor element formed as a Hall sensor, in the main field and a closed, symmetric, ferromagnetic back connection body.
Figure 12:
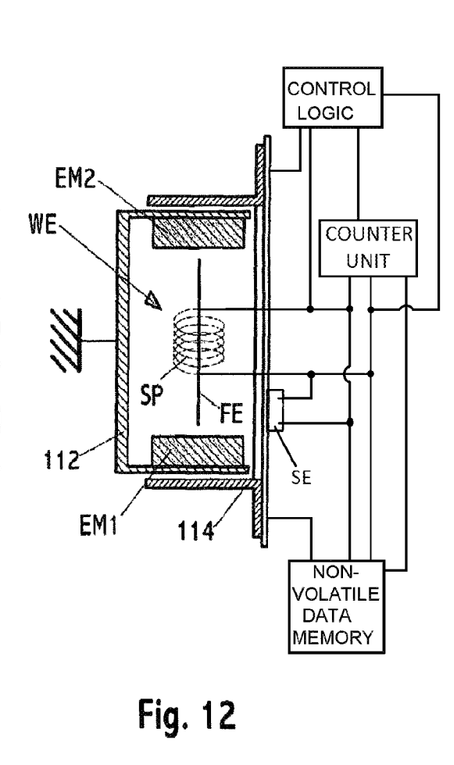
FIG. 12 shows the linear segment counter of FIG. 11 in section.

In the embodiment in form of a linear segment counter shown in the FIGS. 11 and 12, the moving body is, for example, formed as a frame having two ferromagnetic back connection bodies 114 out of soft iron which are formed as a two bars spread out by 90°, the body being moveable along the arrows R1 and R2 across the magnet carrier 112. The excitation magnets $EM_1$ and $EM_2$ which are formed straight, are located opposite to each other in pairs on the magnet carrier 112 formed as a U-shaped frame in section in such an arrangement that the magnetic main field of the output surfaces of the excitation magnets is each directed in the direction of the ferromagnetic element FE, compare also FIG. 3. The excitation magnets $EM_1$, $EM_2$ are applied with alternating polarity on the magnet carrier 112.

Also in this case, the Wiegand element WE comprises a ferromagnetic element FE with an induction coil SP surrounding it; as additional sensor element, the Hall sensor is provided in the stray field, as is also shown in FIG. 3. The common ferromagnetic back connection body comprises a frame having rectangular bars in the inside. As a matter of course, a fine resolution of the segments is also possible here by means of a field plate and/or a Hall sensor, an optical or capacitive sensor.

The operation of the previously described linear segment counter corresponds analogously to the one of the described revolution counter.

It appears that embodiments having several Wiegand elements but only one additional sensor element are possible wherein the Wiegand elements exceeding the number of one are not necessary but are conceivable and are within the scope of this protective right.

The ferromagnetic element can have an arbitrary shape and length. Also a wire which is bent by an angle in axial direction, is conceivable.

LIST OF REFERENCE SIGNS 10 shall
12,112 magnet carrier
13 cross members
14,114 back connection body
15 circuit board
16 part of the magnet carrier 12
17 part of the magnet carrier 12
21 output connection of Wiegand coil SP
22 output connection of Wiegand coil SP
23 output connection of the coil as additional sensor element
24 output connection of the coil as additional sensor element
25 output connection of the Hall sensor
30 cover
31 housing
40 ferromagnetic compensation body
101 rotation axis
102 axis of movement
WE Wiegand element
$EM_1$ excitation magnet
$EM_2$ excitation magnet
FE ferromagnetic element
HS Hall sensor
N north pole
S south pole
R1 arrow
R2 arrow
SP Wiegand coil
ZS additional sensor
SE additional sensor element (Hall sensor, field plate)

The invention claimed is:

1. An absolute linear segment or revolution counter, comprising:
    an excitation magnet (EM1);
    said excitation magnet (EM1) includes a main field;
    an induction coil (SP), said conduction coil wound around an axis;
    a Wiegand element (WE), said Wiegand element being a ferromagnetic element (FE) which is surrounded axially by said induction coil (SP);
    said induction coil (SP) includes a length, said length of said induction coil includes a middle, said middle of said length of said coil (SP) is located in the rotational or movement axis, respectively, within said main field of said excitation magnet (EM1);
    a first sensor element (SE);
    a counter unit having a non-volatile data memory;
    control logic;
    said induction coil supplying electrical energy to said control logic, said counter unit and said sensor element;
    a magnet back connection, said magnet back connection is a ferromagnetic back connection body;
    said Wiegand element (WE) resides concentrically on said axis of said coil (SP);
    said Wiegand element transitions across the main field of said excitation magnet, or, said Wiegand element transitions in the direction of said main field of said excitation magnet (EM1) in each revolution; and,
    said induction coil, said counter, said first sensor element, said logic, and said Wiegand element determine a counter value.

2. The absolute linear segment or revolution counter as claimed in claim 1 further comprising a second excitation magnet (EM2) and wherein said Wiegand element (WE) is located in the main field between said excitation magnets (EM1, EM2), the magnetization axis of which extends as a normal through the center of gravity of said excitation magnets (EM1, EM2).

3. The absolute linear segment or revolution counter as claimed in claim 2 further comprising a magnet carrier and wherein said excitation magnets (EM1, EM2), and said back connection body and said magnet carrier have a center of gravity which lies in the rotational axis.

4. The absolute linear segment or revolution counter as claimed in claim 2 wherein said excitation magnets (EM1, EM2) have the same magnetic properties and geometrical measurements.

5. The absolute linear segment or revolution counter as claimed in claim 2 wherein said excitation magnets (EM1, EM2) have different thicknesses in the axial direction.

6. The absolute linear segment or revolution counter as claimed in claim 5 wherein said excitation magnets (EM1, EM2) having different thicknesses in said axial direction, are formed as separate magnets.

7. The absolute linear segment or revolution counter as claimed in claim 6 wherein said excitation magnets (EM1, EM2) consist of different materials.

8. The absolute linear segment or revolution counter as claimed in claim 2 wherein said ferromagnetic back connection body comprises a closed ring made of soft iron having a high μr which surrounds said excitation magnets (EM1 and EM2).

9. The absolute linear segment or revolution counter as claimed in claim 2 wherein said ferromagnetic back connection body is a frame of soft iron having a u-shaped cross section.

10. The absolute linear segment or revolution counter as claimed in claim 2 in the case of an arrangement as revolution counter, said ferromagnetic back connection body is formed out of soft iron as a cover.

11. The absolute linear segment or revolution counter as claimed in claim 2 wherein said excitation magnets (EM1, EM2) consist of hard magnetic material bonded by plastics, preferably, Ba-ferrite or Co/Sm.

12. Absolute linear segment or revolution counter as claimed in claim 2 wherein said first sensor element (SE) is positioned in the stray field of one of said excitation magnets (EM1, EM2) at least once in each transition across a segment or in each revolution.

13. The absolute linear segment or revolution counter as claimed in claim 2 wherein said first sensor element (SE) is formed as a Hall sensor, as a field plate or as a capacitive sensor.

14. The absolute linear segment or revolution counter as claimed in claim 2 further comprising a second sensor (ZS) serving in the frame work of a multi-turn, as a fine segmental sensor or fine rotational angle sensor, is located in said main field between said excitation magnets (EM1, EM2) each for the purpose of the fine resolution of the linear segment or rotational movement influencing the Wiegand element.

15. The absolute linear segment or revolution counter as claimed in claim 2 wherein said second sensor (ZS) for the fine resolution is formed as a field plate and/or as a Hall sensor or is based on a capacitive basis.

16. The absolute linear segment or revolution counter as claimed in claim 2 wherein said second sensor (ZS) serves the purpose of an additional sensor element (SE) or vice versa in the frame work of a multi-turn.

17. The absolute linear segment or revolution counter as claimed in claim 2 further comprising a charging circuit associated with said counter, wherein the energy storage comprises, preferably, at least one capacitor.

18. The absolute linear segment or revolution counter as claimed in claim 2 wherein said ferromagnetic element (FE) is a pulse or Wiegand wire which is preferably in a straight line or is bent slightly in axial direction.

19. The absolute linear segment or revolution counter as claimed in claim 2 wherein said non-volatile memory of said counter is an EEPROM and/or FRAM.

20. The absolute linear segment or revolution counter as claimed in claim 2 wherein the complete information for evaluating the polarity and the movement direction of said excitation magnets (EM1, EM2) consists of the data in said non-volatile memory and said data from said signals of said induction coil (SP) as well as said additional sensor element (SE).

21. An absolute linear segment or revolution counter, comprising:
   at least one moving excitation magnet (EM1);
   said at least one moving excitation magnet (EM1) has a main field;
   an induction coil (SP);
   a Wiegand element (WE) consisting out of a ferromagnetic element (FE) which is surrounded axially by said induction coil (SP);
   said induction coil (SP) includes a length and a middle of said length;
   said middle of said length of said coil (SP) is in the rotational or movement axes, respectively, within said main field of said at least one excitation magnet (EM1);
   said ferromagnetic element (FE) is located in the field of said excitation magnet;
   one additional sensor element (SE);
   at least one counter unit having a non-volatile data memory for determining complete information for a counter value and for the internal storage of logic data;
   said counter unit and said additional sensor element (SE) having an implementation and arrangement of device elements (EM, SE, WE) such that said Wiegand element (WE) along the axis of coil (SP) is located at least once in each transition or in each revolution in the direction of the main field of the at least one excitation magnet (EM1), said axis is perpendicular to the revolution axis or moving direction of said excitation magnet; and,
   a magnet back connection which is formed by a ferromagnetic back connection body for linearization and homogenization of said magnetic field of said excitation magnet with reference to the Wiegand element.

22. The absolute linear segment or revolution counter according to claim 21, further comprising:
   a second excitation magnet (EM2);
   said ferromagnetic back connection body is arranged on a carrier bearing said excitation magnets (EM1, EM2) and the corresponding non-magnetic balancing body form a resolving counter.

23. The absolute linear segment or revolution counter according to claim 22, characterized in that said ferromagnetic back connection body is a closed ring out of soft iron having a high pr surrounding said excitation magnet (EM1) or said excitation magnets (EM1 and EM2), respectively.

24. The absolute linear segment or revolution counter according to claim 21, characterized in that in the formation as a segment counter said ferromagnetic back connection body is a frame made of soft iron having a u-shaped section.

25. The absolute linear segment or revolution counter according to claim 22, characterized in that in the formation as a resolving counter the arrangement with said excitation magnet (EM1) or said excitation magnets (EM1, EM2), respectively, said back connection body, and said balancing body, provided as necessary, is arranged such that the center of gravity of said magnet or magnets lie in the rotational axis of the counter.

26. The absolute linear segment or revolution counter according to claim 22, characterized in that said Wiegand element (WE) is located in said main field between said respective excitation magnets (EM1, EM2) such that the magnetization axes thereof extends through the center of gravity of said excitation magnets (EM1, EM2) as a normal.

27. The absolute linear segment or revolution counter according to claim 22, characterized in that said additional sensor element (SE) is located in the stray field of one of said exciting magnets (EM1, EM2).

28. The absolute linear segment or revolution counter according to the claim 22, characterized in that said excitation magnets (EM1, EM2) consist out of a hard magnetic material bonded by plastics, preferably Ba-ferrite or Co/Sm.

29. The absolute linear segment or revolution counter according to claim 28, characterized in that said excitation magnets (EM1, EM2) have the same magnetic data and geometrical dimension.

30. The absolute linear segment or revolution counter according to claim 29, characterized in that said excitation magnets (EM1, EM2) have different thicknesses in the axial direction.

31. The absolute linear segment or revolution counter according to claim 21, characterized in that an additional sensor (ZS) serving as a fine sensor or fine rotational angle sensor within a multi-turn is located in said main field.

32. An absolute linear segment or revolution counter, comprising:
   a first excitation magnet (EM1) and a second excitation magnet (EM2);
   said first and second excitation magnets (EM1, EM2) have a center of gravity;
   an induction coil (SP), said conduction coil wound around an axis;

a Wiegand element (WE), said Wiegand element being a ferromagnetic element (FE) associated with said induction coil (SP);

a first sensor element (SE);

a counter unit having a non-volatile data memory;

control logic;

said induction coil supplying electrical energy to said control logic and said counter unit;

said Wiegand element (WE) is located in the main field between said first (EM1) and said second (EM2) excitation magnets (EM1, EM2), said main field includes a magnetization axis extending normally through said center of gravity of said two excitation magnets (EM1, EM2);

said induction coil includes a length and a middle;

said middle of said length of said coil (SP) is located in the rotational or movement axis, respectively, within said main field of said excitation magnets;

a magnet back connection for linearization and homogenisation of said magnetic field of said excitation magnets with reference to said Wiegand element;

said magnet back connection is a ferromagnetic back connection body;

a magnet carrier;

said excitation magnets (EM1, EM2) and said magnet back connection are formed such that the center of gravity of said excitation magnets lies in the rotational or revolution axis;

whereby, said Wiegand element transitions in the direction of said main field of said excitation magnets (EM1, EM2) in each revolution, and said magnet back connection provides linearization and homogenisation of said magnetic field of said excitation magnets with reference to said Wiegand element.

33. The absolute linear segment or revolution counter according to claim 32, characterized in that, said carrier bearing exciting magnets (EM1, EM2) and the corresponding non-magnetic balancing body form a resolving counter.

34. The absolute linear segment or revolution counter according to claim 32, characterized in that said ferromagnetic back connection body is a closed ring out of soft iron having a high pr surrounding said excitation magnet (EM1) or said excitation magnets (EM1 and EM2), respectively.

35. The absolute linear segment or revolution counter according to claim 32, characterized in that in the formation as a segment counter the ferromagnetic back connection body is a frame made of soft iron having a u-shaped section.

36. The absolute linear segment or revolution counter according to claim 32, characterized in that said Wiegand element (WE) is located in said main field between said respective excitation magnets (EM1, EM2) such that the magnetization axes thereof extends through the center of gravity of said excitation magnets (EM1, EM2) as a normal.

37. The absolute linear segment or revolution counter according to the claim 32, characterized in that said middle of said length of said coil (SP) is in the movement axes, within said main field of at least one excitation magnet (EM1).

38. The absolute linear segment or revolution counter according to claim 32, characterized in that said additional sensor element (SE) is located in the stray field of one of said exciting magnets (EM1, EM2).

39. The absolute linear segment or revolution counter according to the claim 32, characterized in that said excitation magnets (EM1, EM2) consist of a hard magnetic material bonded by plastics, preferably Ba-ferrite or Co/Sm.

40. The absolute linear segment or revolution counter according to claim 39, characterized in that said excitation magnets (EM1, EM2) have the same magnetic data and geometrical dimension.

41. The absolute linear segment or revolution counter according to claim 40, characterized in that said excitation elements (EM1, EM2) have different thicknesses in axial direction.

42. The absolute linear segment or revolution counter according to claim 32, characterized in that an additional sensor (ZS) serving as a fine sensor or fine rotational angle sensor within a multi-turn is located in said main field.

* * * * *

UNITED STATES PATENT AND TRADEMARK OFFICE
CERTIFICATE OF CORRECTION

| | | |
|---|---|---|
| PATENT NO. | : 8,766,625 B2 | Page 1 of 1 |
| APPLICATION NO. | : 12/673581 | |
| DATED | : July 1, 2014 | |
| INVENTOR(S) | : Mehnert et al. | |

It is certified that error appears in the above-identified patent and that said Letters Patent is hereby corrected as shown below:

In the Specification

Col. 1, after the title, insert --Applicant claims priority to German Patent Application No.: DE 10 2007 039 050.7 filed August 17, 2007 which is hereby incorporated by reference.--.

Col. 1, line 46, after "speak" delete "clan" and insert --of an-- therefor.

Col. 5, line 2, after "ferromagnetic" delete "hack" and insert --back-- therefor.

Col. 5, line 41, after "circuit" delete "hoard" and insert --board-- therefor.

Col. 7, line 29, delete "shall" and insert --shaft-- therefor.

In the Claims

Claim 23, Col. 10, line 19, after "high" delete "pr" and insert --µr-- therefor.

Claim 24, Col. 12, line 4, after "high" delete "pr" and insert --µr-- therefor.

Signed and Sealed this
Twenty-first Day of October, 2014

Michelle K. Lee
*Deputy Director of the United States Patent and Trademark Office*